(12) United States Patent
Hara (10) Patent No.: US 9,819,823 B2
(45) Date of Patent: Nov. 14, 2017

(54) INFORMATION PROCESSING APPARATUS, INFORMATION PROCESSING METHOD, AND NON-TRANSITORY COMPUTER READABLE MEDIUM FOR CONVERTING PRINT DATA AND RELEASING MEMORY

(71) Applicant: FUJI XEROX CO., LTD., Tokyo (JP)

(72) Inventor: Yuki Hara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/014,502

(22) Filed: Feb. 3, 2016

(65) Prior Publication Data

US 2017/0078510 A1 Mar. 16, 2017

(30) Foreign Application Priority Data

Sep. 16, 2015 (JP) ................................. 2015-182847

(51) Int. Cl.
*H04N 1/00* (2006.01)
*G06F 3/12* (2006.01)

(52) U.S. Cl.
CPC ......... *H04N 1/00954* (2013.01); *G06F 3/122* (2013.01); *G06F 3/1244* (2013.01); *G06F 3/1285* (2013.01); *H04N 1/00344* (2013.01)

(58) Field of Classification Search
CPC .............................. G06F 3/1244; G06F 3/1243
USPC .............. 358/1.17, 1.16; 710/7, 20; 711/169
See application file for complete search history.

(56) References Cited

U.S. PATENT DOCUMENTS 5,796,930 A * 8/1998 Gauthier ................... G06F 3/12
345/554
2004/0252339 A1* 12/2004 Toda ..................... G06F 3/1214
358/1.16

FOREIGN PATENT DOCUMENTS

JP H06-106810 A 4/1994
JP 2003-319167 A 11/2003
JP 2008-033634 A 2/2008

* cited by examiner

*Primary Examiner* — Jamares Q Washington
(74) *Attorney, Agent, or Firm* — Oliff PLC (57) ABSTRACT

An information processing apparatus includes a drawing resource acquisition unit that segments a common drawing resource in a first memory into drawing resource segments, successively acquires the drawing resource segments from the first memory, and stores the drawing resource segments in a second memory, a drawing data generating unit that generates the drawing data in a format supported by an image forming apparatus, using the drawing resource segments stored in the second memory, and a memory area releasing unit that releases part or whole of a memory area of one drawing resource segment, after the drawing data generating unit has generated the drawing data using the one drawing resource segment and before the drawing resource acquisition unit stores in the second memory another drawing resource segment acquired subsequent to the one drawing resource segment.

11 Claims, 8 Drawing Sheets

INFORMATION PROCESSING APPARATUS, INFORMATION PROCESSING METHOD, AND NON-TRANSITORY COMPUTER READABLE MEDIUM FOR CONVERTING PRINT DATA AND RELEASING MEMORY

CROSS-REFERENCE TO RELATED APPLICATIONS

This application is based on and claims priority under 35 USC 119 from Japanese Patent Application No. 2015-182847 filed Sep. 16, 2015.

BACKGROUND (i) Technical Field

The present invention relates to an information processing apparatus, an information processing method, and a non-transitory computer readable medium.

(ii) Related Art

A form or an image is commonly used on pages in a print job. This printing is referred to as variable data printing. In the variable data printing, print data is interpreted by dividing the print data into a common portion that is reused and common to the pages, and a variable portion, and intermediate data of each of the common portion and the variable portion is output. When the intermediate data is developed into bit-map image data, the common portions that are referenced by the variable portions are collected and linked.

A technique of reducing a memory capacity of a memory in use or reducing a transfer amount of the intermediate data is disclosed in the variable data printing of the related art.

SUMMARY

According to an aspect of the invention, there is provided an information processing apparatus. The information processing apparatus includes a drawing resource acquisition unit that, when print data representing images of plural pages is converted into drawing data, segments a common drawing resource on a first memory into drawing resource segments, successively acquires the drawing resource segments from the first memory, the first memory having stored the common drawing resource that is commonly used across the pages, and stores the drawing resource segments in a second memory, a drawing data generating unit that generates the drawing data in a format supported by an image forming apparatus, using the drawing resource segments stored in the second memory, and a memory area releasing unit that, if the drawing resource acquisition unit has acquired one drawing resource segment and has stored the one drawing resource segment in the second memory, releases part or whole of a memory area of the one drawing resource segment after the drawing data generating unit has generated the drawing data using the one drawing resource segment and before the drawing resource acquisition unit stores in the second memory another drawing resource segment acquired subsequent to the one drawing resource segment.

BRIEF DESCRIPTION OF THE DRAWINGS

Exemplary embodiments of the present invention will be described in detail based on the following figures, wherein.

DETAILED DESCRIPTION

Exemplary embodiments of the present invention are described below with reference to the drawings.

Figure 1:
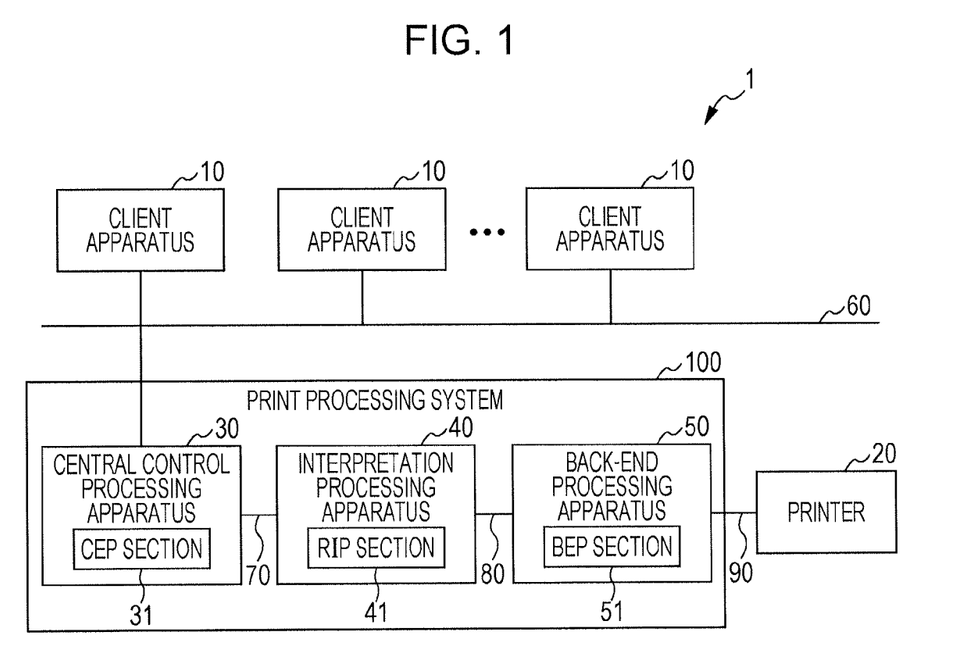
FIG. 1 illustrates a configuration example of a printing system.

FIG. 1 illustrates a configuration example of a printing system 1 of an exemplary embodiment of the present invention. The printing system 1 includes plural client apparatuses 10, a printer 20, and a print processing system 100. The print processing system 100 includes a central control processing apparatus 30, an interpretation processing apparatus 40, and a back-end processing apparatus 50. The client apparatus 10 is connected with the central control processing apparatus 30 via a communication network 60. The central control processing apparatus 30 is connected to the interpretation processing apparatus 40 via a communication network 70. The interpretation processing apparatus 40 is connected to the back-end processing apparatus 50 via a communication network 80. The back-end processing apparatus 50 is connected to the printer 20 via a communication network 90. The communication networks 60, 70, 80, and 90 are wired or wireless local area networks (LANs). The interpretation processing apparatus 40 and the back-end processing apparatus 50 may be implemented using software, and in such a case, the communication network functions for inter-process communication.

The client apparatus 10 is a computer that transmits to the print processing system 100 a print instruction including print data. The print data transmitted by the client apparatus 10 is described in page description language (PDL).

The printer 20 is an image forming apparatus that forms an image on a recording medium, such as a paper sheet. The printer 20 may be a continuous paper printer or a cut-sheet feed printer. The printing method of the printer 20 may be an electrophotographic system or an ink-jet system.

Each of the central control processing apparatus 30, the interpretation processing apparatus 40, and the back-end processing apparatus 50, forming the print processing system 100, is a computer. Each of these apparatuses includes a controller, a memory, and a communication unit. The controller includes a central processing unit (CPU), a read-only memory (ROM), and a random-access memory (RAM). The CPU implements a variety of functions described below by loading a program into the RAM from the ROM or a memory and by executing the program. The memory may be a storage device, such as a hard disk drive. The memory stores the program to be executed by the CPU, or a variety of data. The communication unit is an interface card, such as a data communication card. The communication unit controls communication with another apparatus. The apparatuses are individually discussed below.

The central control processing apparatus 30 includes a central processor (CEP) section 31. The CEP section 31 represents a function implemented by the controller of the central control processing apparatus 30. Upon receiving a print instruction including print data from the client apparatus 10, the CEP section 31 transmits the print data to the interpretation processing apparatus 40 to execute a print process responsive to the print instruction. The print data is described page description language (PDL).

The interpretation processing apparatus 40 includes a raster image processor (RIP) section 41. The RIP section 41 performs a function implemented by the controller of the interpretation processing apparatus 40. The RIP section 41 interprets the print data received from the CEP section 31, and then generates intermediate data representing an image of each page described by the print data. The intermediate data thus generated of each page is transmitted to the back-end processing apparatus 50. Plural interpretation processing apparatuses 40 may be employed to perform a parallel operation.

The back-end processing apparatus 50 includes a back-end processor (BEP) section 51. The BEP section 51 represents a function implemented by the controller of the back-end processing apparatus 50. The BEP section 51 processes the intermediate data of each page received from the RIP section 41 to generate raster data of each page. The BEP section 51 causes the printer 20 to perform printing by transmitting the generated raster data to the printer 20. The back-end processing apparatus 50 is an example of an "information processing apparatus" of the exemplary embodiment of the present invention. Plural back-end processing apparatuses 50 may be employed to perform a parallel operation.

Figure 2:
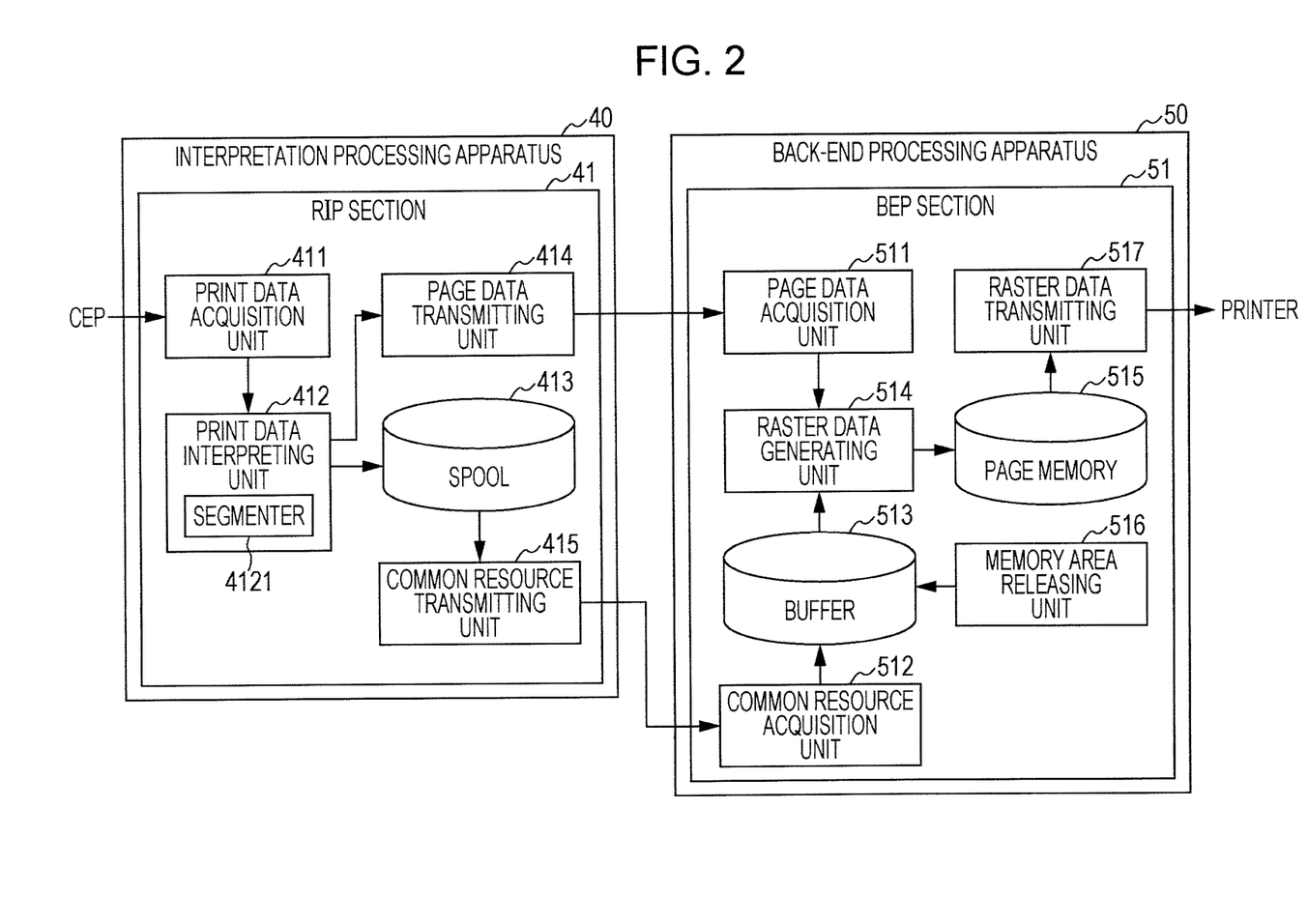
FIG. 2 illustrates a configuration example of a raster image processor (RIP) section and a back-end processor (BEP) section.

FIG. 2 illustrates a configuration example of the RIP section 41 and the BEP section 51. The RIP section 41 includes a print data acquisition unit 411, a print data interpreting unit 412, a spool 413, a page data transmitting unit 414, and a common resource transmitting unit 415. The BEP section 51 includes a page data acquisition unit 511, a common resource acquisition unit 512, a buffer 513, a raster data generating unit 514, a page memory 515, a memory area releasing unit 516, and a raster data transmitting unit 517.

The print data acquisition unit 411 in the BEP section 51 acquires the print data from the CEP section 31. The print data herein is described in PDL.

The print data interpreting unit 412 interprets the print data acquired by the print data acquisition unit 411 to generate the intermediate data (hereinafter referred to as "page data") for each page described by the print data.

Each page represented by the print data includes one or more objects (or image element). The types of objects include a character string, a graphic (a line drawing or a figure), and an image (a continuous tone image). Some objects included in a page may be reused, in other words, may appear by plural times in the images of all pages of the print data. A type of the object may be a form or an image in the case of PostScript (registered trademark). If the print data interpreting unit 412 detects an object that is reused in the interpretation of the print data, the print data interpreting unit 412 generates the intermediate data of that object (hereinafter referred to as "common resource"), and stores the intermediate data on the spool 413. The print data interpreting unit 412 then describes, in the page data, identification information identifying the common resource rather than the common resource itself. The identification information is a uniform resource locator (URL) indicating a storage location of the common resource, for example. Based on the type of drawing command in the print data, the print data interpreting unit 412 determines whether an object represented by the drawing command is a reused type or not.

If the size of the common resource stored in the spool 413 is larger than a predetermined size (hereinafter referred to as a "system fixed value"), a segmenter 4121 in the print data interpreting unit 412 segments the common resource into pieces of data, each of which is smaller in size than the system fixed value, and stores the segmented data in the spool 413. Each piece of the data segmented from the common resource is referred to as a "common resource segment" in the following discussion. If there is no need to discriminate the common resource segment from the common resource, the common resource segment is simply referred to as a "common resource". If the segmenter 4121 segments the common resource and then stores the common resource segments in the spool 413, the print data interpreting unit 412 describes, in the page data, identification information that identifies each common resource segment. The system fixed value is 256 MB, for example.

If the print data interpreting unit 412 detects the intermediate data having become a reused object in the spool 413 during the interpretation of the print data, the storing of the intermediate data of the object may be omitted. In such a case, the print data interpreting unit 412 describes in the page data the identification information identifying the common resource already stored in the spool 413. For example, by referencing the identification (ID) of an object included in the print data, the print data interpreting unit 412 determines whether the intermediate data of the object has been stored or not.

The page data transmitting unit 414 transmits to the BEP section 51 the print data generated by the print data interpreting unit 412.

In response to a transmission request from the BEP section 51, the common resource transmitting unit 415 reads the common resource from the spool 413 and outputs the common resource to the BEP section 51.

The page data acquisition unit 511 in the BEP section 51 acquires the print data from the RIP section 41.

The common resource acquisition unit 512 segments the common resource into the common resource segments and then receives the common resource segments successively from the spool 413 in the RIP section 41 storing the common resource, and then stores the common resource segments in the buffer 513. The spool 413 is an example of a "first memory" of the exemplary embodiment of the present invention, and the buffer 513 is an example of a "second memory" of the exemplary embodiment of the present invention. The common resource acquisition unit 512 is an example of a "drawing resource acquisition unit".

In response to an acquisition request from the raster data generating unit 514, the common resource acquisition unit 512 segments the common resource into common resource segments and successively acquires the common resource segments successively from the spool 413 in the RIP section 41, and then stores the common resource segments in the buffer 513.

The common resource acquisition unit 512 starts acquiring another common resource segment before the raster data generating unit 514 completes the generation of raster data in accordance with one common resource segment.

The clause "before the raster data generating unit 514 completes the generation of the raster data" is intended to specifically mean that "before the raster data is written in the page memory 515" or "before the generation of the raster data". The other common resource segment is a common resource segment that is segmented and generated from the same common resource from which the one common resource segment is segmented and generated. The other common resource segment is not necessarily limited to a common resource segment that the common resource acquisition unit 512 has acquired immediately subsequent to the one common resource segment. The clause "the common resource acquisition unit 512 starts acquiring the other common resource segment" is intended to specifically mean that "the common resource acquisition unit 512 transmits a transmission request to the common resource transmitting unit 415 in the RIP section 41" or that "the common resource acquisition unit 512 starts receiving the other common resource from the common resource transmitting unit 415".

The raster data generating unit 514 interprets the print data acquired by the page data acquisition unit 511 and generates the raster data of each page (in other words, rasterizes each page). More specifically, the raster data generating unit 514 interprets each object forming the print data, and generates the raster data for each object. In such a case, the raster data generating unit 514 directly rasterizes an object if the object is complete by the data in the print data alone. If the object is of a type that references the common resource, the raster data generating unit 514 rasterizes the object using the common resource that is segmented and acquired by the common resource acquisition unit 512. Upon detecting identification information identifying a common resource in the interpretation of the object, the raster data generating unit 514 issues an acquisition request of the common resource to the common resource acquisition unit 512. The raster data generating unit 514 generates the raster data and writes the generated raster data in the page memory 515. The raster data generating unit 514 is an example of a "drawing data generating unit".

The memory area releasing unit 516 releases part or whole of the memory area of the buffer 513. The clause "the memory area releasing unit 516 releases part or whole of the memory area" is intended to mean that the memory area releasing unit 516 makes the memory area available to store new data. More specifically, the clause "the memory area releasing unit 516 releases part or whole of the memory area" is intended to mean that "the memory area releasing unit 516 deletes the data stored in the memory area" or that "the memory area releasing unit 516 sets the memory area to be in a state that allows new data to overwrite the data stored therein".

The common resource acquisition unit 512 may acquire one common resource segment and may store the one common resource segment in the buffer 513. In this operation, the memory area releasing unit 516 releases part or whole of the memory area of the one common resource segment after the raster data generating unit 514 generates the raster data using the one common resource segment but before the common resource acquisition unit 512 stores in the buffer 513 another common resource segment that is acquired subsequent to the one common resource segment.

The clause "after the raster data generating unit 514 generates the raster data" is intended to specifically mean "after the raster data is written on the page memory 515". The other common resource segment is a common resource segment segmented from the same common resource from which the one common resource segment has been segmented. The other common resource segment is not limited to the common resource segment that is acquired by the common resource acquisition unit 512 immediately subsequent to the acquisition of the one common resource segment.

The raster data transmitting unit 517 transmits the raster data, which is also written in the page memory 515, to the printer 20.

Figure 3:
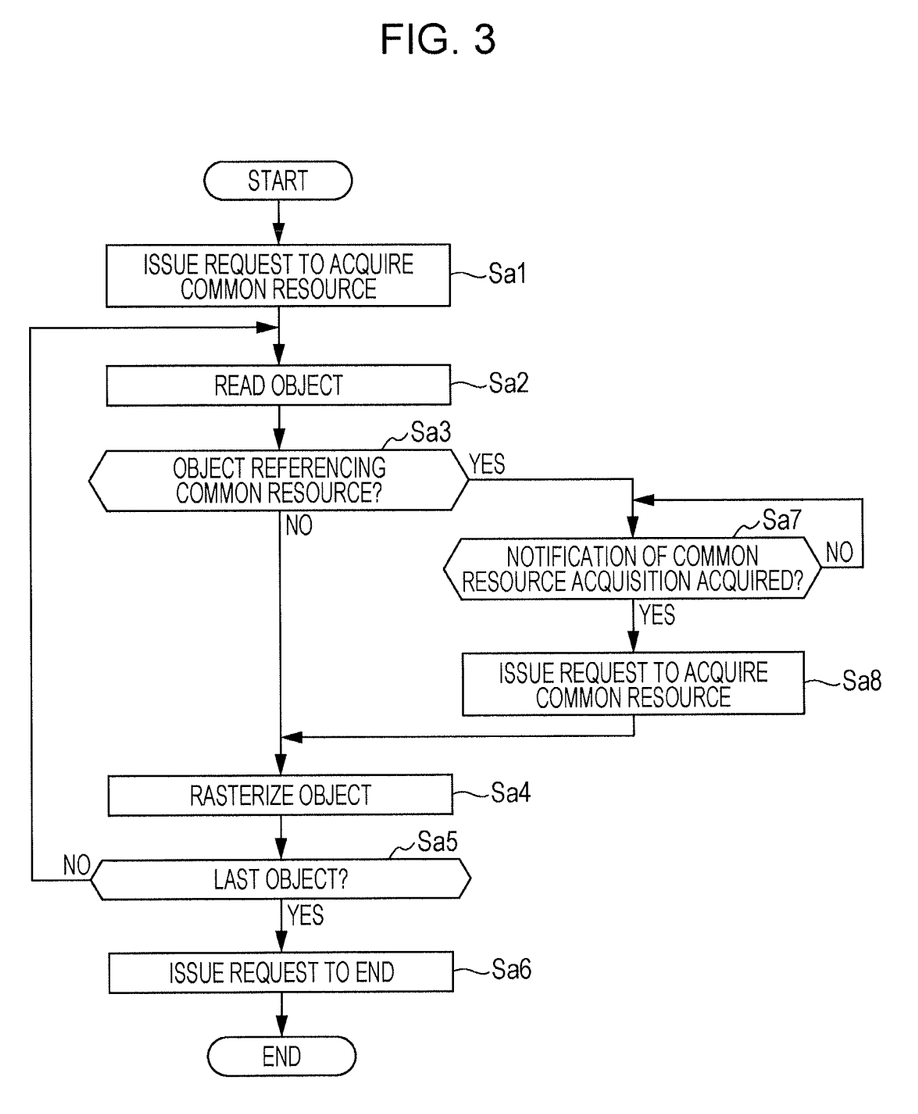
FIG. 3 is a flowchart illustrating an example of a rasterization process.
Figure 4:
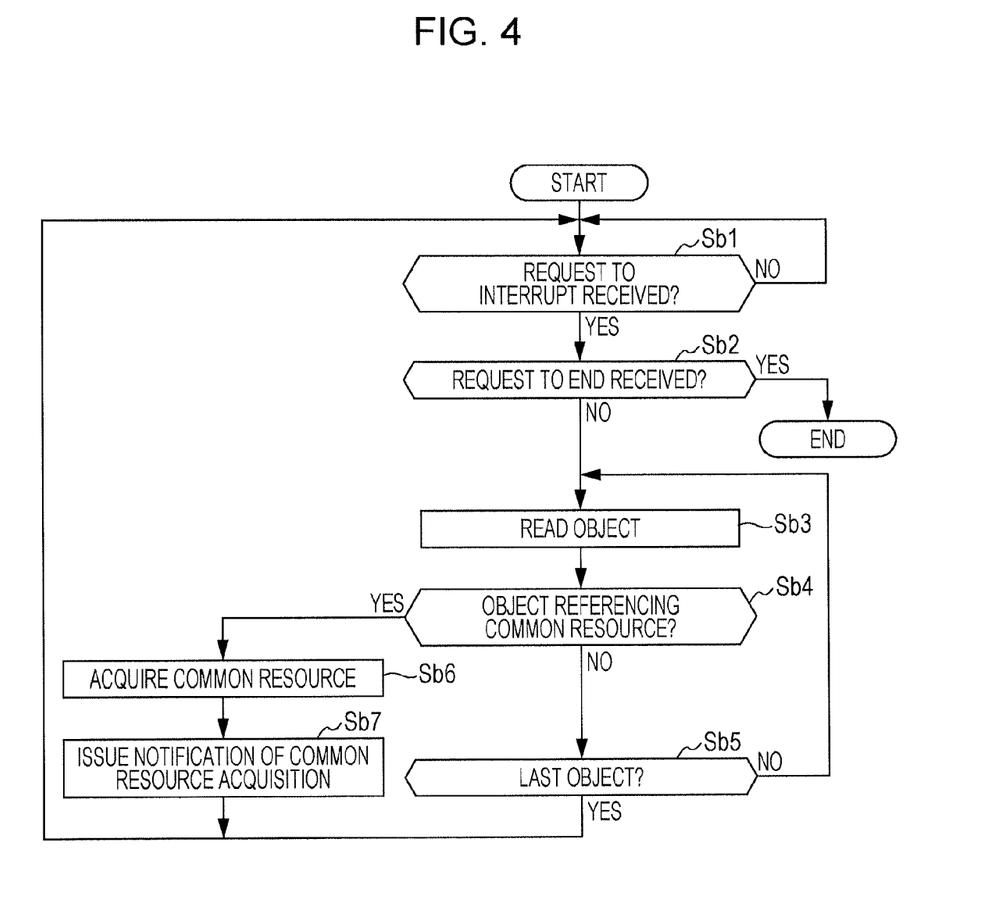
FIG. 4 is a flowchart illustrating an example of a common resource acquisition process.

The process of the BEP section 51 is described below. More specifically, a rasterization process of the raster data generating unit 514 in the BEP section 51 and a common resource acquisition process of the common resource acquisition unit 512 in the BEP section 51 are described below. FIG. 3 is a flowchart illustrating an example of the rasterization process. FIG. 4 is a flowchart illustrating an example of the common resource acquisition process. The common resource acquisition unit 512 and the raster data generating unit 514 perform the processes thereof by referencing the same page data.

The raster data generating unit 514 issues a common resource acquisition request to the common resource acquisition unit 512 (step Sa1). The common resource acquisition request works as an interrupt request to the common resource acquisition unit 512.

The raster data generating unit 514 reads an object forming the print data (step Sa2). In this case, the raster data generating unit 514 starts reading the object, beginning with the head of the print data.

The raster data generating unit 514 determines whether the read object is an object that references the common resource (step Sa3). If the determination results indicate that the read object is an object that does not reference the common resource (no branch from step Sa3), the raster data generating unit 514 rasterizes the object, and writes the generated raster data in the page memory 515 (step Sa4).

The raster data generating unit 514 determines whether the read object is a last object of the print data (step Sa5). If the determination results indicate that the read object is not the last object (no branch from step Sa5), the raster data generating unit 514 returns to step Sa2 to read a next object. On the other hand, if the determination results indicate the read object is the last object (yes branch from step Sa5), the raster data generating unit 514 issues an end request as an interrupt request to the common resource acquisition unit 512 (step Sa6). The rasterization process thus ends.

If the determination results in step Sa3 indicate that the read object is an object that references the common resource (yes branch from step Sa3), the raster data generating unit 514 determines whether a common resource acquisition notification has been received from the common resource acquisition unit 512 (step Sa7). The determination results indicate that the common resource acquisition notification has not been received (no branch from step Sa7), the raster data generating unit 514 waits on standby. If the determination results indicate that the common resource acquisition notification has been received (yes branch from step Sa7), the raster data generating unit 514 issues a common resource acquisition request to the common resource acquisition unit 512 (step Sa8). The raster data generating unit 514 requests the common resource acquisition unit 512 to acquire a next common resource before the raster data is generated in accordance with the previously acquired common resource.

After issuing the common resource acquisition request, the raster data generating unit 514 acquires from the buffer 513 the common resource acquired by the common resource acquisition unit 512. The raster data generating unit 514 interprets the common resource, generates the raster data, and then writes the raster data into the page memory 515 (step Sa4). After the raster data is written in the page memory 515, the memory area releasing unit 516 releases the storage area of the common resource in the buffer 513. Upon generating the raster data, the raster data generating unit 514 performs the operation in step Sa5.

The rasterization process has been described.

The common resource acquisition unit 512 determines whether the interrupt request has been received from the raster data generating unit 514 (step Sb1). If the determination results indicate that the interrupt request has not been received (no branch from step Sb1), the common resource acquisition unit 512 waits on standby. On the other hand, if the determination results indicate that the interrupt request has been received (yes branch from step Sb1), the common resource acquisition unit 512 determines whether the acquired interrupt request is an end request (step Sb2). If the determination requests indicate that the acquired interrupt request is the end request (yes branch from step Sb2), the common resource acquisition unit 512 ends the common resource acquisition process. On the other hand, if the determination results indicate that the acquired interrupt request is not the end request (in other words, the acquired interrupt request is a common resource acquisition request) (no branch from step Sb2), the common resource acquisition unit 512 reads an object forming the print data (step Sb3). In this case, the common resource acquisition unit 512 starts reading the object, beginning with the head of the print data.

The common resource acquisition unit 512 determines whether the read object is an object that references the common resource (step Sb4). If the read object is not an object that references the common resource (no branch from step Sb4), the common resource acquisition unit 512 determines whether the read object is a last object in the print data (step Sb5). If the read object is not the last object in the print data (no branch from step Sb5), the common resource acquisition unit 512 returns to step Sb3 to read a next object. If the read object is the last object in the print data (yes branch from step Sb5), the common resource acquisition unit 512 returns to step Sb1.

If the determination results in step Sb4 indicate that the read object is an object that references the common resource (yes branch from step Sb4), the common resource acquisition unit 512 acquires the common resource (step Sb6). More specifically, the common resource acquisition unit 512 transmits a transmission request of the common resource to the RIP section 41 and then receives the common resource from the RIP section 41. When the common resource is received, the common resource acquisition unit 512 stores the common resource in the buffer 513. Upon acquiring the common resource, the common resource acquisition unit 512 issues a common resource acquisition notification to the raster data generating unit 514 (step Sb7). The common resource acquisition unit 512 then returns to step Sb1.

The common resource acquisition process has been described.

Figure 5:
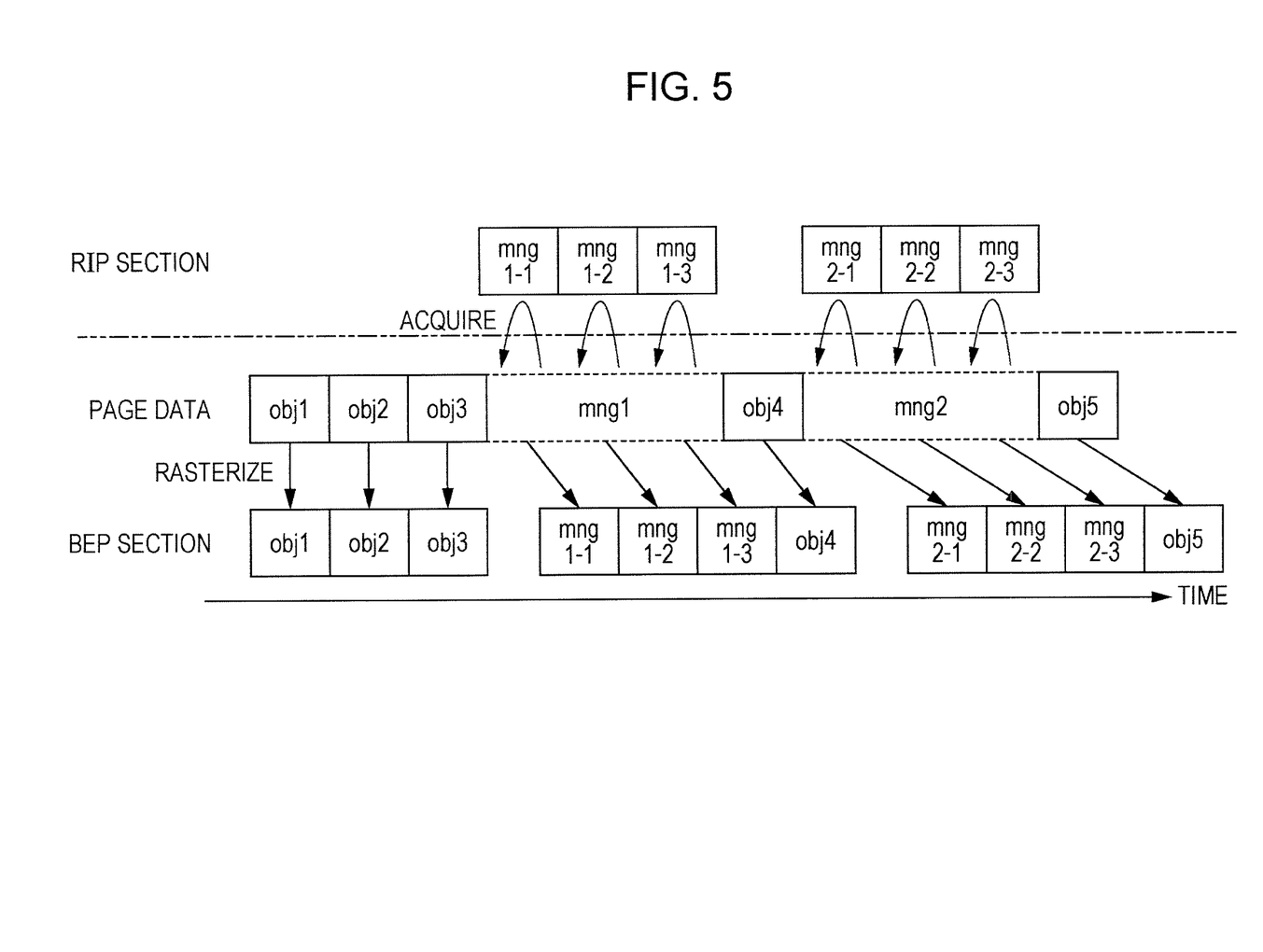
FIG. 5 illustrates an example of a rasterization process of each object forming page data.

Specific examples of the rasterization process and common resource acquisition process, described above, are described below. FIG. 5 illustrates an example of the rasterization process in which each object forming the page data is rasterized. Referring to FIG. 5, from among objects obj forming the print data, an object obj4 references a common resource mng1, and an object obj5 references a common resource mng2. Each of the common resources mng1 and mng2 is segmented and the resulting common resource segments are acquired by the common resource acquisition unit 512.

The raster data generating unit 514 issues a common resource acquisition request to the common resource acquisition unit 512 prior to the rasterization of the leading object obj1 (step Sa1). In response to the common resource acquisition request, the common resource acquisition unit 512 acquires from the RIP section 41 a common resource segment mng1-1 that the object obj4 is to reference (step Sb6). Upon acquiring the common resource segment mng1-1, the common resource acquisition unit 512 issues a common resource acquisition notification to the raster data generating unit 514 (step Sb7).

After issuing the common resource acquisition request, the raster data generating unit 514 rasterizes each of the objects obj1 through obj3 that do not reference the common resource mng (step Sa4).

The raster data generating unit 514 rasterizes the objects obj1 through obj3, and then acquires the common resource mng1 before rasterizing the object obj4. This is because the object obj4 is an object that references the common resource mng1. More specifically, the raster data generating unit 514 determines whether an acquisition notification of the common resource mng1-1 has been acquired from the common resource acquisition unit 512 (step Sa7). If the acquisition notification of the common resource mng1-1 has been acquired from the common resource acquisition unit 512 (yes branch from step Sa7), the raster data generating unit 514 issues to the common resource acquisition unit 512 the acquisition request of a next common resource (step Sa8). In response to the acquisition request, the common resource acquisition unit 512 acquires from the RIP section 41 a common resource segment mng1-2 that is referenced by the object obj4 (step Sb6). This acquisition operation is performed in parallel with the generation of the raster data that is based on the common resource segment mng1-1. Upon acquiring the common resource segment mng1-2, the common resource acquisition unit 512 issues a common resource acquisition notification to the raster data generating unit 514 (step Sb7).

After issuing the common resource acquisition request, the raster data generating unit 514 acquires the common resource segment mng1-1 from the buffer 513. The raster data generating unit 514 interprets the common resource segment mng1-1 to generate the raster data and then writs the raster data in the page memory 515 (step Sa4). When the generated raster data is written in the page memory 515, the memory area releasing unit 516 releases the memory area of the buffer 513 occupied by the common resource segment mng1-1. The releasing of the memory area in this example is performed prior to the storage of a common resource segment mng1-3 in the buffer 513.

The raster data generating unit 514 generates the raster data in accordance with the common resource segment mng1-1, and then determines whether the acquisition notification of the common resource segment mng1-2 has been received (step Sa7). If the acquisition notification of the common resource segment mng1-2 has been received (yes branch from step Sa7), the raster data generating unit 514 issues an acquisition request of a next common resource to the common resource acquisition unit 512 (step Sa8). In response to the reception of the acquisition request, the common resource acquisition unit 512 acquires from the RIP section 41 the common resource segment mng1-3 that is referenced by the object obj4 (step Sb6). In the example, the acquisition is performed in parallel with the generation of the raster data that is based on the common resource segment mng1-2. Upon acquiring the common resource segment mng1-3, the common resource acquisition unit 512 issues the common resource acquisition notification to the raster data generating unit 514 (step Sb7).

After issuing the common resource acquisition request, the raster data generating unit 514 acquires the common resource segment mng1-3 from the buffer 513. The raster data generating unit 514 interprets the common resource segment mng1-2 to generate the raster data, and then writes the raster data in the page memory 515 (step Sa4). When the generated raster data is written in the page memory 515, the memory area releasing unit 516 releases the memory area in the buffer 513 occupied by the common resource segment mng1-2. In this example, the releasing of the memory area is performed prior to the storage of a common resource segment mng 2-1 in the buffer 513.

When the raster data is generated from the common resource segment mng1-2, the raster data generating unit 514 determines whether the acquisition notification of the common resource segment mng1-3 has been acquired (step Sa7). If the acquisition notification of the common resource segment mng1-3 has been acquired (yes branch from step Sa7), the raster data generating unit 514 issues the acquisition request of a next common resource to the common resource acquisition unit 512 (step Sa8). In response to the acquisition request, the common resource acquisition unit 512 acquires from the RIP section 41 the common resource segment mng2-1 that is referenced by the object obj5 (step Sb6). Upon acquiring the common resource segment mng2-1, the common resource acquisition unit 512 issues the common resource acquisition notification to the raster data generating unit 514 (step Sb7).

After issuing the common resource acquisition request, the raster data generating unit 514 acquires the common resource segment mng1-3 from the buffer 513. The raster data generating unit 514 generates the raster data by interpreting the common resource segment mng1-3, and writes the raster data in the page memory 515 (step Sa4). Since all the common resource segments mng1 referenced by the object obj4 are acquired, the raster data generating unit 514 rasterizes the object obj4. When the generated raster data is written in the page memory 515, the memory area releasing unit 516 releases the memory area of the buffer 513 occupied by the common resource segment mng1-3.

The rasterization process of the object obj4 has been described. The rasterization process is also performed on the object obj5 in a way similar to the object obj4.

In accordance with the rasterization process and common resource acquisition process described above, the common resource stored in the RIP section 41 is segmented and then acquired by the BEP section 51. The memory area releasing unit 516 successively releases the storage areas of the common resource segments in the order according to which the common resource segments are interpreted and the raster data thereof is generated.

In accordance with the rasterization process and common resource acquisition process, the BEP section 51 acquires a common resource segment while rasterizing another common resource segment in parallel.

Modifications

The exemplary embodiment may be modified as described below. The modifications described below may be combined.

First Modification

Figure 6:
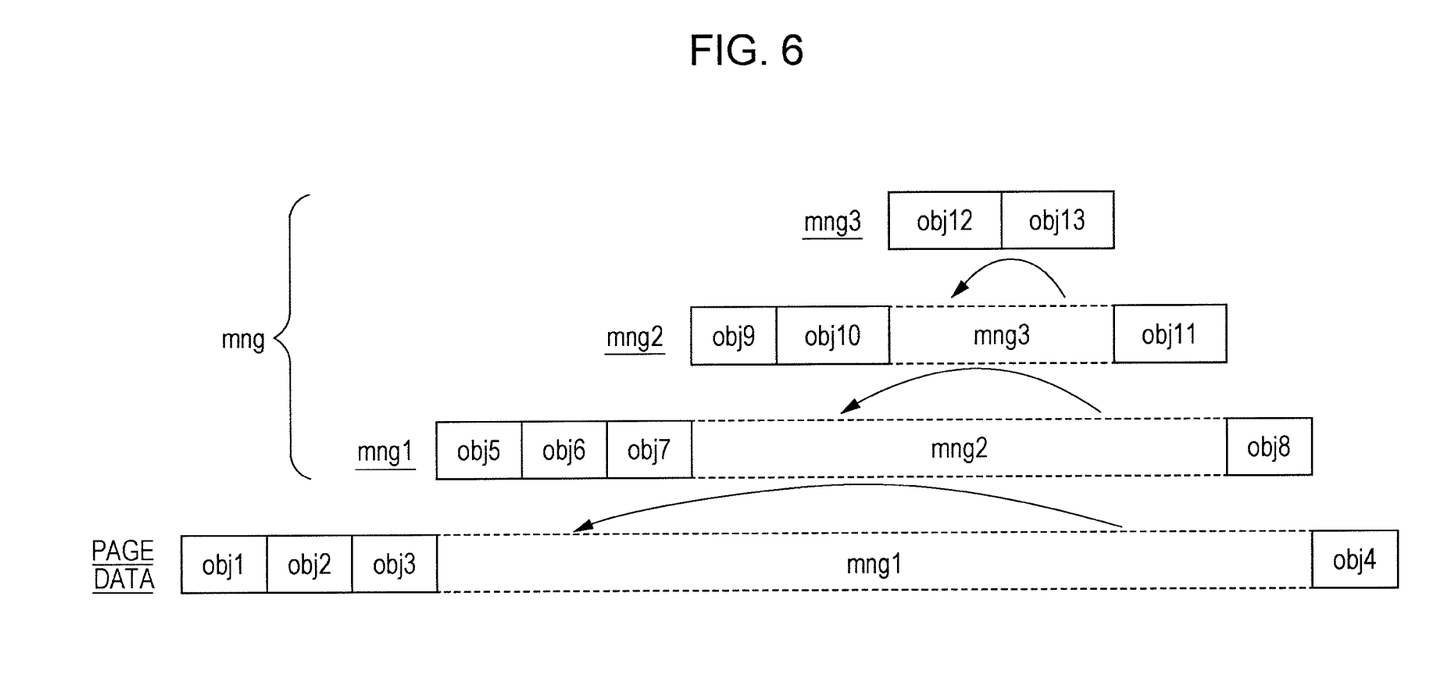
FIG. 6 illustrates an example of a common resource having a nested structure.

The common resource may have a nested structure in the exemplary embodiment. More specifically, the common resource may include plural common resources layered in a nested structure. FIG. 6 illustrates an example of a common resource having a nested structure.

Referring to FIG. 6, a common resource mng has a nested structure. The common resource mng includes plural partial common resources mng1, mng2, and mng3 layered in a nested structure. The partial common resource mng1 is referenced by the object obj4 forming the print data, and includes objects obj5 through obj8, and the partial common resource mng2. The partial common resource mng2 is referenced by the object obj8, and includes objects obj9 through obj11, and the partial common resource mng3. The partial common resource mng3 is referenced by obj11 and includes objects obj12 and obj13. In the discussion that follows, the partial common resource mng1 that is directly referenced by the print data is referred to as a first layer (or nest 1). A partial common resource mng referenced by a partial common resource mng in an n-th layer (or nest n) is assumed to be in an (n+1)-th layer (or nest (n+1)).

In order to generate the page data of FIG. 6, the print data interpreting unit 412 in the RIP section 41 stores a partial common resource mng serving as a reference destination in the spool 413 and describes identification information identifying the partial common resource mng in a partial common resource mng serving as a reference source or in the print data. More specifically, the print data interpreting unit 412 stores the partial common resource mng3 in the spool 413 and describes the identification information identifying the partial common resource mng3 in the partial common resource mng2. Next, the print data interpreting unit 412 stores the partial common resource mng2 in the spool 413, and describes the identification information identifying the partial common resource mng2 in the partial common resource mng1. Finally, the print data interpreting unit 412 stores the partial common resource mng1 in the spool 413 and describes the identification information identifying the partial common resource mng1 in the print data.

If the size of the partial common resource mng to be stored in the spool 413 is larger than a segment size, the segmenter 4121 in the print data interpreting unit 412 segments the partial common resource mng into segments, each having a size smaller than the segment size, and then stores the resulting segments in the spool 413. The segment size is determined according to layer. The segment size of the n-th layer is determined in accordance with the following formula:

$$V = X/2^n$$

where the variable X is a system fixed value. If the system fixed value is "1 GB", the segment size of the first layer is "512 MB", the segment size of the second layer is "256 MB", and the segment size of the third layer is "128 MB".

If the segmenter 4121 segments the partial common resource mng as a reference destination and the resulting common resource segments are stored in the spool 413, the print data interpreting unit 412 describes the identification information identifying each of the common resource segments in a partial common resource mng serving as a reference source or in the print data.

The common resource acquisition unit 512 in the BEP section 51 segments the partial common resource mng into partial common resource segments in the spool 413 in the RIP section 41 and successively acquires the partial common resource segments from the spool 413, and then stores the partial common resource segments in the buffer 513. The size of the common resource segment segmented from the n-th partial common resource mng that is counted from the partial common resource mng serving as a start point and acquired first by the common resource acquisition unit 512 is equal to or smaller than a value that is determined by dividing a predetermined value by 2 to the n-th power.

Figure 7:
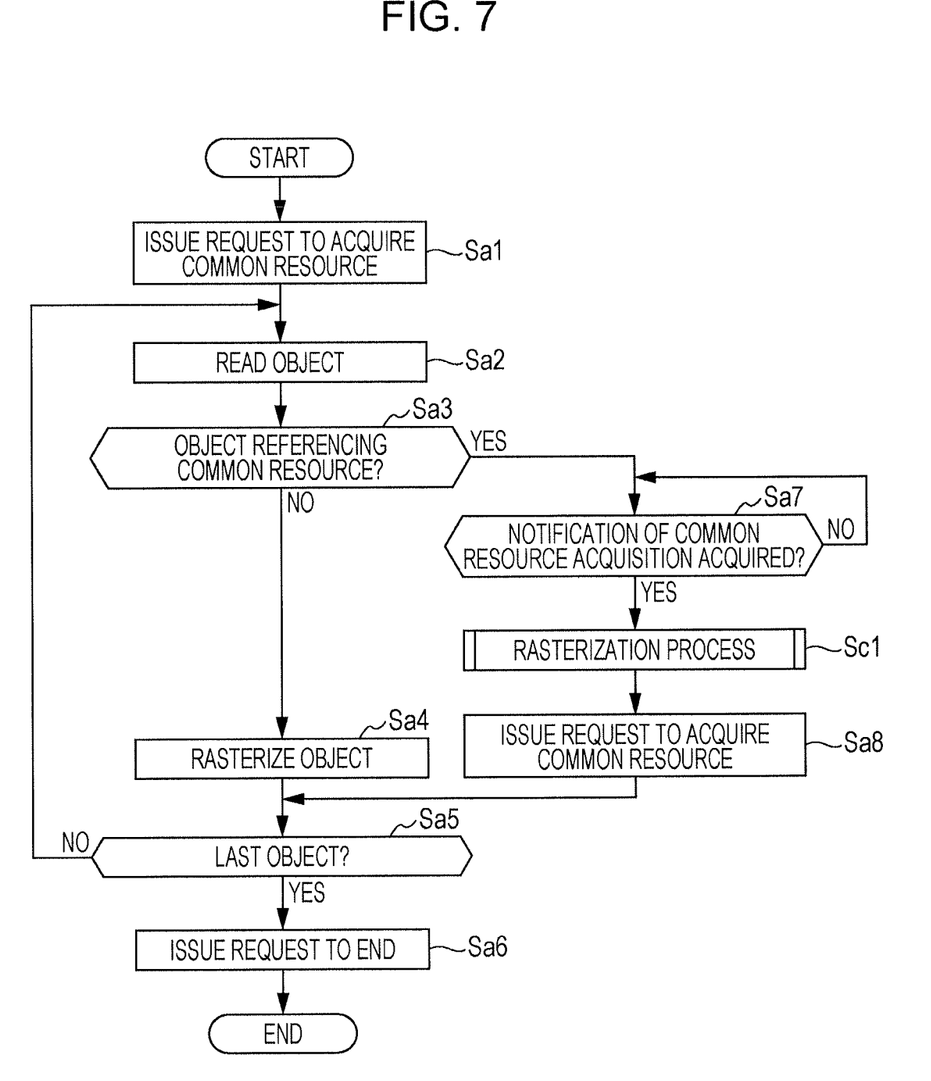
FIG. 7 is a flowchart illustrating an example of the rasterization process.
Figure 8:
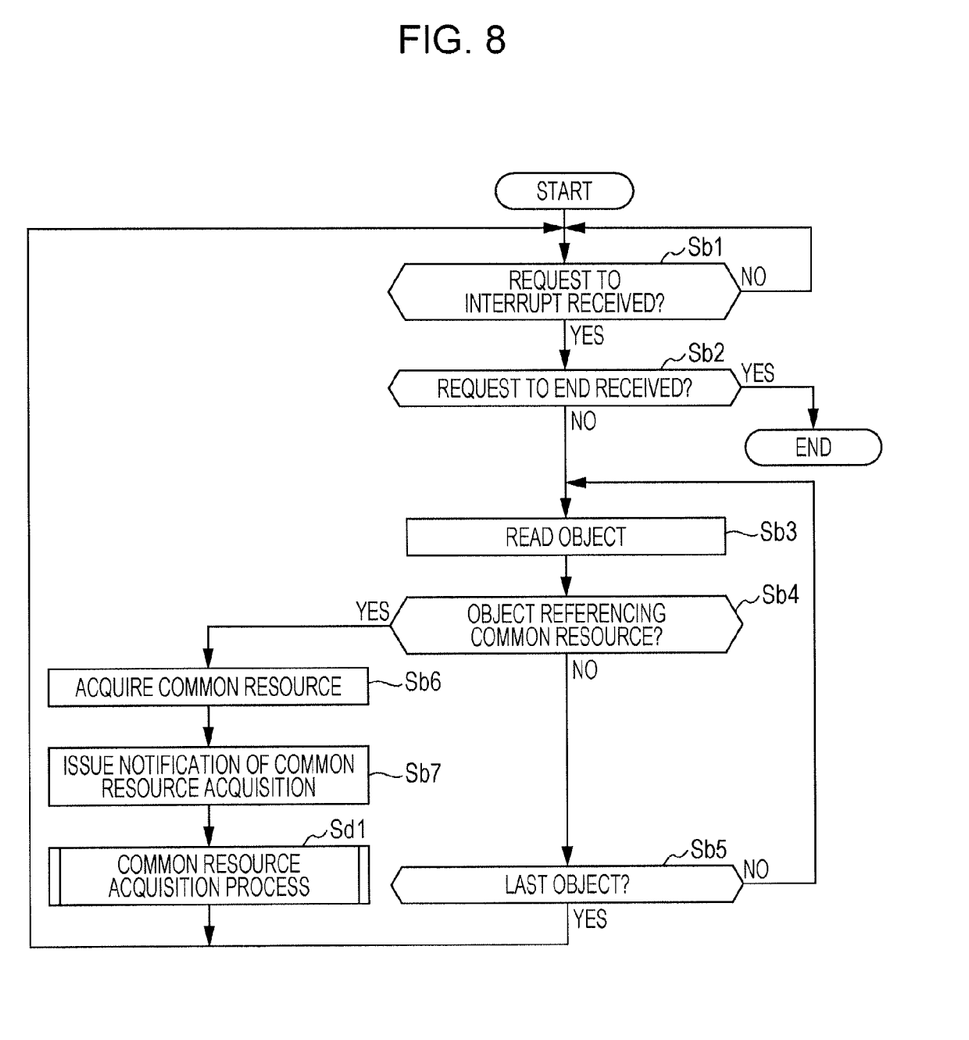
FIG. 8 is a flowchart illustrating an example of a common resource acquisition process.

The process of the BEP section 51 of a first modification is described below. FIG. 7 is a flowchart illustrating an example of the rasterization process of the first modification. The rasterization process of FIG. 7 is different from the rasterization process of FIG. 3 in that the rasterization process of FIG. 7 includes step Sc1. The following discussion focuses on this difference. FIG. 8 is a flowchart illustrating an example of the common resource acquisition process of the first modification. The common resource acquisition process of FIG. 8 is different from the common resource acquisition process of FIG. 4 in that the common resource acquisition process of FIG. 8 includes step Sd1. The following discussion focuses on this difference.

Upon acquiring the common resource acquisition notification (step Sa7), the raster data generating unit 514 acquires from the buffer 513 the common resource acquired by the common resource acquisition unit 512. The raster data generating unit 514 performs the rasterization process of FIG. 7 on the acquired common resource (steps Sa1 through Sa8 and Sc1 of FIG. 7). More specifically, the raster data generating unit 514 reads each object forming the acquired common resource. If the object is not an object that references the common resource, the raster data generating unit 514 rasterizes the object directly. If the object is an object that references the common resource, the raster data generating unit 514 acquires the common resource before rasterizing the object. In this case, the raster data generating unit 514 performs the rasterization process of FIG. 7 (steps Sa1 through Sa8 and Sc1 of FIG. 7) on the acquired common resource. Since the common resource of the first modification has a nested structure, the rasterization process is recursively performed.

The common resource acquisition unit 512 acquires the common resource (yes branch from step Sb4), and issues the common resource acquisition notification to the raster data generating unit 514 (step Sb7). The common resource acquisition unit 512 performs the common resource acquisition process of FIG. 8 (steps Sb1 through Sb7 and Sd1 of FIG. 8) on the acquired common resource. More specifically, upon receiving the acquisition request from the raster data generating unit 514, the common resource acquisition unit 512 reads each object forming the acquired common resource. If the object is an object that references the common resource, the common resource acquisition unit 512 acquires the common resource that is referenced by the object. In this case, the common resource acquisition unit 512 performs the common resource acquisition process of FIG. 8 (steps Sb1 through Sb7 and Sd1 of FIG. 8) on the acquired common resource. Since the common resource of the first modification has a nested structure, the common resource acquisition process is recursively performed.

In the rasterization process and common resource acquisition process of the first modification, the size of the acquired common resource segment decreases as the depth of the layer of the nested structure increases. For this reason, an upper limit is set on the memory area configured to store the common resource.

Second Modification

The common resource of the exemplary embodiment is an example of a "common drawing resource" of the exemplary embodiment of the present invention. The common drawing resource is commonly used across plural pages when print data representing images of the plural pages is converted into drawing data. The print data in this case is data described in PDL. For example, the print data is data described in PostScript (registered trademark). Each page represented by the print data includes one or more objects (in other words, an image element). The types of the objects includes a character string, a graphic (a line drawing or a figure), and an image (a continuous tone image). The drawing data is data, which is in a format supported by an image forming apparatus, such as raster data. The drawing data is derived through intermediate data from the print data. The intermediate data is data having a granularity intermediate between the print data and the drawing data. In the intermediate data, an object described in PDL is expressed by infinitesimal elements, each having a simple shape. The format of the intermediate data includes a display list format.

The common drawing resource is data representing an object. In particular, the common drawing resource represents an object reused across plural pages (namely, a common portion). The reused object refers to a form or an image. The common drawing data is intermediate data of an object, and more specifically represents borders, or company logos.

Third Modification

The common resource segment of the exemplary embodiment is an example of a "drawing resource segment" of the exemplary embodiment of the present invention. The drawing resource segment is part of the common drawing resource. The drawing resource segments are generated by segmenting the common drawing resource. The data size of the drawing resource segment is set to be equal to or below a predetermined value. For example, the data size of the drawing resource segment is set to be 256 MB.

The drawing resource segment is referenced by a variable drawing resource. More specifically, the identification information described in the variable drawing resource identifies the drawing resource segment. The identification information identifies a storage location of the drawing resource segment, such as URL. The variable drawing resource is data representing an object. In particular, the variable drawing resource is data that represents an object that varies from page to page (namely, a variable portion). The variable drawing resource is intermediate data of an object. The page data in the exemplary embodiment is an example of the variable drawing resource.

Fourth Modification

The partial common resource mng of the first modification is an example of a "partial common drawing resource" of the exemplary embodiment of the present invention. The partial common drawing resource is part of the common drawing resource layered in a nested structure. The partial common drawing resource is referenced by the variable drawing resource. The partial common drawing resource references another partial common drawing resource.

Fifth Modification

The formula to calculate the segment size of the partial common resource mng has been described for exemplary purposes. Another formula may be employed as long as the formula results in a segment size in the (n+1)-th layer smaller than a segment size in the n-th layer.

Sixth Modification

In the exemplary embodiment or each of the modifications thereof, the program to be executed by the controller of the interpretation processing apparatus 40 or the back-end processing apparatus 50 may be provided in a stored state on one of storage media including a magnetic tape, a magnetic disk, a flexible disk, an optical disk, a magneto-optical disk, and a memory. The program may be downloaded via a communication network, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a drawing resource acquisition unit that, when print data representing images of a plurality of pages is converted into drawing data, segments a common drawing resource in a first memory into drawing resource segments, successively acquires the drawing resource segments from the first memory, the first memory having stored the common drawing resource that is commonly used across the pages, and stores the drawing resource segments in a second memory;
a drawing data generating unit that generates the drawing data in a format supported by an image forming apparatus, using the drawing resource segments stored in the second memory; and
a memory area releasing unit that, if the drawing resource acquisition unit has acquired one drawing resource segment and has stored the one drawing resource segment in the second memory, releases part or whole of a memory area of the one drawing resource segment after the drawing data generating unit has generated the drawing data using the one drawing resource segment and before the drawing resource acquisition unit stores in the second memory another drawing resource segment acquired subsequent to the one drawing resource segment.

2. The information processing apparatus according to claim 1, wherein the drawing resource acquisition unit starts acquiring the other drawing resource segment before the drawing data generating unit has generated the drawing data using the one drawing resource segment.

3. The information processing apparatus according to claim 1, wherein the common drawing resource comprises a plurality of partial common drawing resources layered in a nested structure,
wherein the drawing resource acquisition unit segments each of the partial common drawing resources on the first memory into drawing resource segments, successively acquires the drawing resource segments from the first memory, and stores the drawing resource segments in the second memory, and
wherein a size of a drawing resource segment segmented from a partial common drawing resource at an n-th layer counted from as a start point a partial common drawing resource that the drawing resource acquisition unit has acquired first from the partial common drawing resources is larger than a size of a drawing resource segment segmented from a partial common drawing resource at an (n+1)-th layer.

4. The information processing apparatus according to claim 2, wherein the common drawing resource comprises a plurality of partial common drawing resources layered in a nested structure,
wherein the drawing resource acquisition unit segments each of the partial common drawing resources on the first memory into drawing resource segments and successively acquires the drawing resource segments from the first memory, and stores the drawing resource segments in the second memory, and
wherein a size of a drawing resource segment segmented from a partial common drawing resource at an n-th layer counted from as a start point a partial common drawing resource that the drawing resource acquisition unit has acquired first from the partial common drawing resources is larger than a size of a drawing resource segment segmented from a partial common drawing resource at an (n+1)-th layer.

5. The information processing apparatus according to claim 3, wherein the size of the drawing resource segment segmented from the partial common drawing resource at the n-th layer from among the partial common drawing resources is equal to or smaller than a value that is calculated by dividing a predetermined value by 2 to the n-th power.

6. The information processing apparatus according to claim 4, wherein the size of the drawing resource segment segmented from the partial common drawing resource at the n-th layer from among the partial common drawing resources is equal to or smaller than a value that is calculated by dividing a predetermined value by 2 to the n-th power.

7. An information processing method comprising:
in converting print data representing images of a plurality of pages into drawing data, segmenting a common drawing resource in a first memory into drawing resource segments, successively acquiring the drawing resource segments from the first memory, the first memory having stored the common drawing resource that is commonly used across the pages, and storing the drawing resource segments in a second memory;
generating the drawing data in a format supported by an image forming apparatus, using the drawing resource segments stored in the second memory; and
with one drawing resource segment acquired and stored in the second memory, releasing part or whole of a memory area of the one drawing resource segment after the drawing data has been generated using the one drawing resource segment and before another drawing resource segment acquired subsequent to the one drawing resource segment is stored in the second memory.

8. A non-transitory computer readable medium storing a program causing a computer to execute a process for processing information, the process comprising:
in converting print data representing images of a plurality of pages into drawing data, segmenting a common drawing resource in a first memory into drawing resource segments, successively acquiring the drawing resource segments from the first memory, the first memory having stored the common drawing resource that is commonly used across the pages, and storing the drawing resource segments in a second memory;
generating the drawing data in a format supported by an image forming apparatus, using the drawing resource segments stored in the second memory; and
with one drawing resource segment acquired and stored in the second memory, releasing part or whole of a memory area of the one drawing resource segment after the drawing data has been generated using the one drawing resource segment and before another drawing resource segment acquired subsequent to the one drawing resource segment is stored in the second memory.

9. The information processing apparatus according to claim 1, further comprising a page memory that stores the drawing data generated by the drawing data generating unit.

10. The information processing method according to claim 7, further comprising storing the generated drawing data in a page memory.

11. The non-transitory computer readable medium according to claim 8, wherein the process further comprises storing the generated drawing data in a page memory.

\* \* \* \* \*